United States Patent
Freytag

(10) Patent No.: US 7,783,843 B2
(45) Date of Patent: Aug. 24, 2010

(54) BUS INTERFACE ADAPTED TO COALESCE SNOOP RESPONSES

(75) Inventor: Vincent R. Freytag, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1052 days.

(21) Appl. No.: 11/130,536

(22) Filed: May 16, 2005

(65) Prior Publication Data

US 2006/0259707 A1    Nov. 16, 2006

(51) Int. Cl.
    *G06F 12/00*     (2006.01)
    *G06F 13/00*     (2006.01)
    *G06F 13/28*     (2006.01)

(52) U.S. Cl. ............... 711/146; 711/121; 711/122; 711/141; 711/144

(58) Field of Classification Search ............ 711/121, 711/122, 141, 144, 146
See application file for complete search history.

(56) References Cited

U.S. PATENT DOCUMENTS

| | | | |
|---|---|---|---|
| 5,893,151 A | 4/1999 | Merchant | |
| 6,138,218 A | 10/2000 | Arimilli et al. | |
| 6,279,086 B1 * | 8/2001 | Arimilli et al. | 711/143 |
| 6,292,906 B1 * | 9/2001 | Fu et al. | 714/6 |
| 6,343,347 B1 | 1/2002 | Arimilli et al. | |
| 6,347,363 B1 | 2/2002 | Arimilli et al. | |
| 6,356,972 B1 * | 3/2002 | Chin et al. | 710/310 |
| 6,366,984 B1 | 4/2002 | Carmean et al. | |
| 6,484,240 B1 | 11/2002 | Cypher et al. | |
| 6,487,621 B1 | 11/2002 | MacLaren | |
| 6,601,144 B1 | 7/2003 | Arimilli et al. | |
| 6,604,162 B1 | 8/2003 | Mosur et al. | |
| 6,615,322 B2 * | 9/2003 | Arimilli et al. | 711/145 |
| 6,738,869 B1 * | 5/2004 | Moran et al. | 711/145 |
| 6,829,665 B2 | 12/2004 | Jones et al. | |
| 2003/0135696 A1 | 7/2003 | Rankin et al. | |
| 2004/0003184 A1 | 1/2004 | Safranek et al. | |
| 2004/0030843 A1 | 2/2004 | Arimilli et al. | |
| 2004/0068595 A1 | 4/2004 | Dieffenderfer et al. | |
| 2004/0193809 A1 | 9/2004 | Dieffenderfer et al. | |
| 2004/0255085 A1 | 12/2004 | Dieffenderfer et al. | |

\* cited by examiner

*Primary Examiner*—Sheng-Jen Tsai
*Assistant Examiner*—Michael Alsip

(57) ABSTRACT

In a bus interface adapted for usage in a multiple-core processor, an interface couples a bus to the one or more processor cores. The bus interface comprises a queue coupled to the interface which is adapted to receive snoop responses from the processor cores and coalesce snoop responses from the processor cores into a single snoop response that reflects snoop responses from all processor cores.

10 Claims, 6 Drawing Sheets

BUS INTERFACE ADAPTED TO COALESCE SNOOP RESPONSES

BACKGROUND

Multi-processor systems have a set of processors interconnected across a local or distributed network. The local network may be contained within a single computer and the distributed network may be part of a local area network, wide area network, or others. Each processor may be interconnected with other processors on a single processor bus or connected to a local bus separate from other processor buses. Interconnected processors may be grouped in clusters. Each cluster can be connected to a processor bus and routed to a system memory via a system memory controller or a bus bridge.

Processors in multi-processor systems include hierarchical inclusive caches in which higher level caches store the same cache lines stored in lower level caches in addition to other cache lines. The lower level caches are closer to the execution units of a processor and have a relatively fast access time and relatively lower storage capacity in comparison to a higher level cache. Due to inclusivity of all cache lines in the lower level cache within the higher level cache, only the higher level cache monitors commands on the system bus. The monitoring is termed snooping. A cache snoops a command by comparing addresses associated with snooped commands to cache line addresses. If the addresses match, the cache updates a memory coherency image state for the cache line and sends a snoop response based on the updated memory coherency image state. If no match is found, the cache sends a snoop response indicative of the condition.

Snoop responses in multiple-processor systems are typically handled by exposing each processor core to a system bus and increasing the number of hit and hit-modified (hitm) snoop lines which are wire ORed together. Accordingly, each processor core drives associated snoop responses to the bus, potentially causing compatibility problems when single-core and dual-core systems are combined.

SUMMARY

In accordance with an embodiment of a bus interface adapted for usage in a multiple-core processor, an interface couples a bus to the one or more processor cores. The bus interface comprises a queue coupled to the interface which is adapted to receive snoop responses from the processor cores and coalesce snoop responses from the processor cores into a single snoop response that reflects snoop responses from all processor cores.

BRIEF DESCRIPTION OF THE DRAWINGS

Embodiments of the invention relating to both structure and method of operation may best be understood by referring to the following description and accompanying drawings.

DETAILED DESCRIPTION

A bus interface is adapted for usage in a multiple-core processor and comprises a queue coupled to the interface which receives snoop responses from the processor cores and coalesces snoop responses from the processor cores into a single snoop response that reflects snoop responses from all processor cores. A logic associated with the queue detects cacheable transactions on a bus from another caching agent and forwards the transactions to the multiple processor cores. If the transaction is received from a local processor core, the transaction is forwarded to the other local processor cores, but may send or may not send the transaction to the local processor core that originated the transaction as appropriate according to content of the transaction.

Figure 1A:
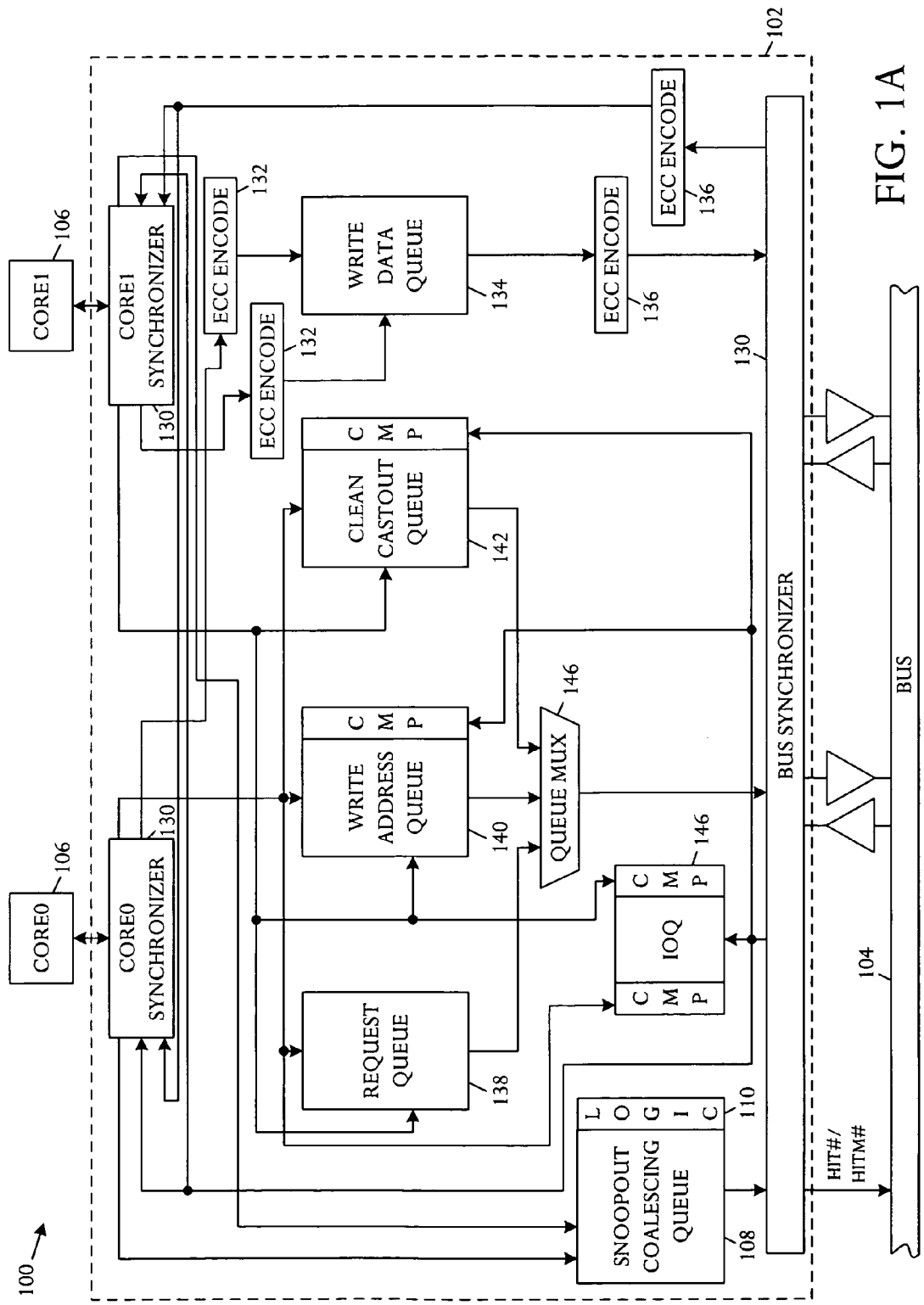
FIG. 1A is a schematic block diagram illustrating an embodiment of a bus interface adapted for usage in a multiple-core processor.

Referring to FIG. 1A, a schematic block diagram illustrates an embodiment of a bus interface 100 adapted for usage in a multiple-core processor. The illustrative embodiment depicts a bus interface 100 for usage with a dual-core processor. Some implementations may include duplication of the depicted structures to form a multiple-core processor with more than two processor cores. The bus interface 100 comprises an interface 102 which couples a bus 104 to the one or more processor cores 106. The bus interface 100 further comprises a queue 108 coupled to the interface 102 which is adapted to receive snoop responses from the processor cores 106 and coalesce snoop responses from the processor cores 106 into a single snoop response that reflects snoop responses from all processor cores 106.

The bus interface 100 may further comprise a logic 110 which operates in conjunction with the queue 108 and is adapted to manage the queue 108 as an out-of-order insert queue and supply the coalesced single snoop response to the bus 104. The logic 110 may be implemented as any suitable executable component such as a processor, a central processing unit (CPU), a digital signal processor, a computer, a state machine, a programmable logic array, and the like. In other embodiments, logic may be implemented in other devices such as a host computer, a workstation, a storage controller, a network appliance, and others. The logic may be considered to be software or firmware that executes on hardware elements or may be the operating processing elements or circuitry.

The logic 110 monitors for a cacheable transaction on the bus 104 from a remote caching agent, specifically an agent other than the local processor cores 106, and responds to such a transaction by forwarding the transaction to all local processor cores 106. The logic 110 sends a cacheable transaction from a local processor core 106 to the other local cores 106, but may or may not send the transaction or snoop to the core originating the transaction based on bits asserted in the transaction.

Figure 1B:
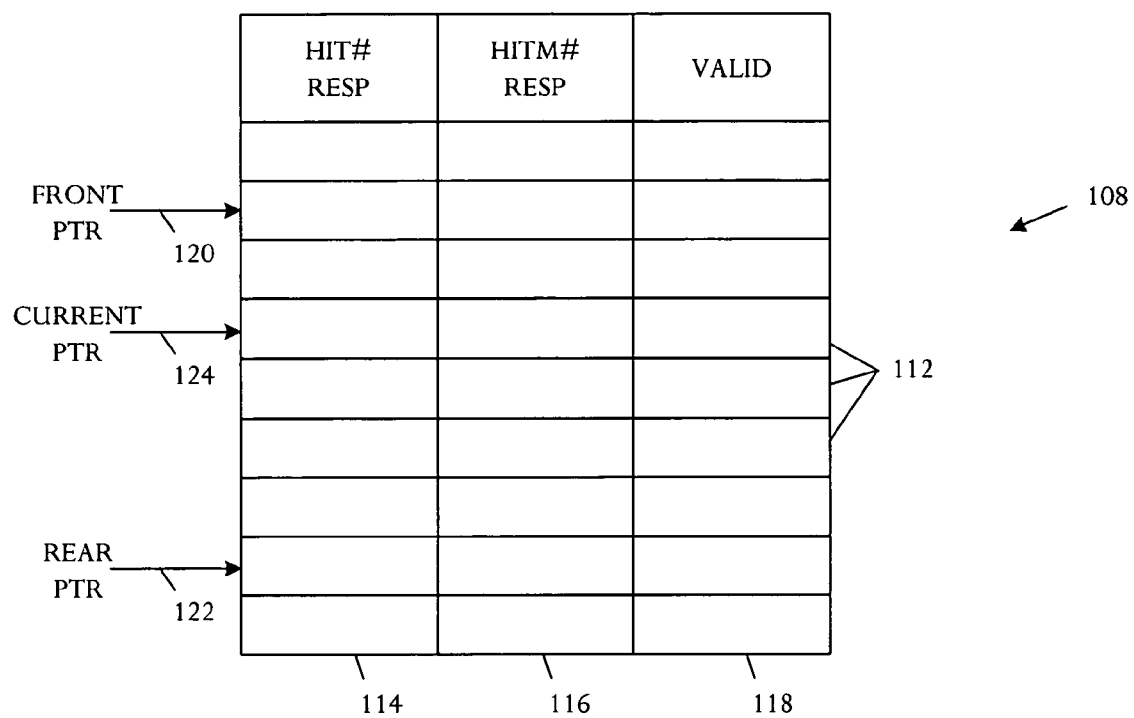
FIG. 1B is a schematic block diagram depicting an embodiment of a queue adapted for usage in a multiple-core processor.

Referring to FIG. 1B, a schematic block diagram illustrates an embodiment of a queue 108 adapted for usage in a multiple-core processor. In some implementations, the queue 108 may be operative as a snoop coalesce queue comprising an array of multiple-bit storage elements 112 for the individual processor cores 106. In a particular configuration, bit fields of the storage elements 112 comprise a hit response bit 114, a hit modified (hitm) response bit 116, and a valid bit 118.

The hit response bit (hit) 114 and the hit modified response bit (hitm) 116 are used to indicate that a line is valid or invalid in a snooping agent, whether a line is in the modified state, also called a dirty state, in the caching agent, or whether the snoop phase is to be executed. The hit response bit 114 and the hit modified response bit 116 may be used to maintain cache coherency at a system level.

The queue 108 may include multiple pointers configured to track entries on the queue. In the illustrative example, the pointers include a front pointer 120 adapted to track a next snoop response to be coalesced to the bus, a rear pointer 122 adapted to track a most recent snoop inserted on the queue, and a current pointer 124 adapted to track pending in-order responses from each of the processor cores.

In a particular implementation, the logic 100 may be adapted to detect a condition of multiple processor cores 106 having valid entries at the front pointer 120. In response to the condition, the logic 110 coalesces a snoop response.

The logic 110 may further be adapted to detect a condition of multiple processor cores 106 having valid snoop responses at the front pointer 120 that indicate a hit response from one processor core and no hitm responses from any processor cores. In response to the condition, the logic 110 forms a hit response. The condition of a hit indication in one processor core and no hitm responses in other cores implies that a line is marked shared in the cache.

The logic 110 may be further adapted to detect a condition of multiple processor cores 106 having valid snoop responses at the front pointer 120 that indicate a hitm response from one processor core. The logic 100 responds to the condition by forming a hitm response.

The logic 110 may also be adapted to detect a condition of the processor cores 106 having illegal snoop responses.

Referring again to FIG. 1A, the bus interface 100 further includes first and second synchronizers 130 adapted for connection to two individual processor cores 106. The synchronizers 130 enable communication and interaction with processor cores that may be configured to operate at different frequency ratios relative to the individual processor cores and relative to the bus 104.

In the illustrative embodiment, the queue 108 may be called a SnoopOut Coalescing Buffer or Snoop Coalesce Queue. The SnoopOut Coalescing Buffer 108 performs multiple functions. A relatively predominant function is the coalescing of snoop sign offs from more than one processor core 106 into a single snoop response that is output to the bus 104. For example, the depicted embodiment supports two processor cores 106. Two input signal lines are input to the Snoop-Out Coalescing Buffer 108 and one output signal line is output to the bus 104 so that the two core processors 106 appear as a single agent to the bus 104. Accordingly, a purpose of the bus interface 100 is a capability to hide agents behind the bus 106 and the snoop buffer 108.

Another function of the bus interface 100 is a capability to enable detection of illegal snoop responses. One example of an illegal snoop response is a condition whereby both processor cores signal a line modified (hitm). At most only a single processor core can have a line modified at one time. The bus interface 100 generates an error signal in response to detection of the illegal condition.

A further function of the bus interface 100 is management of core processor defeaturing whereby the deactivation and/or failure of a processor core 106 is managed to enable a appropriate snoop response for application to the bus in accordance with operations of remaining processor cores. The defeaturing capability enables correct operation no matter how many of the serviced processor cores are active and operable. For example, in some embodiments, processor core defeaturing may be implemented by allocating signals for a missing processor queue in the manner of a processor core that is always clean.

Although the depicted embodiment of the bus interface 100 shows interface connections to two processor cores, expansion to additional cores is supported using the same or similar structures and methods.

The illustrative bus interface 100 is depicted to further include an Error Checking and Correction (ECC) encode block 132 from each of the synchronizers 130 to a write data queue 134 and ECC correction blocks 136 connected from the write data queue 134 and the bus 104, and connected from the bus 104 to the synchronizers 130. The Error Checking and Correction (ECC) blocks enable single-bit errors to be corrected in real-time without degrading system operation. Multiple bit errors are detected and result in a machine check since automatic correction is typically not possible.

The bus interface 100 further includes a request queue 138 adapted to queue four entries from each core processor, a write address queue 140, and a clean castout queue 142. Both the write address queue 140 and the clean castout queue 142 have attached comparators for comparing queue entries. Data from the request queue 138, the write address queue 140, and the clean castout queue 142 are multiplexed at a queue multiplexer 144 for passing the data to the bus 104. An in-order queue (IOQ) 146 is connected between the processor cores 106 and the bus through synchronizers 130.

Figure 2:
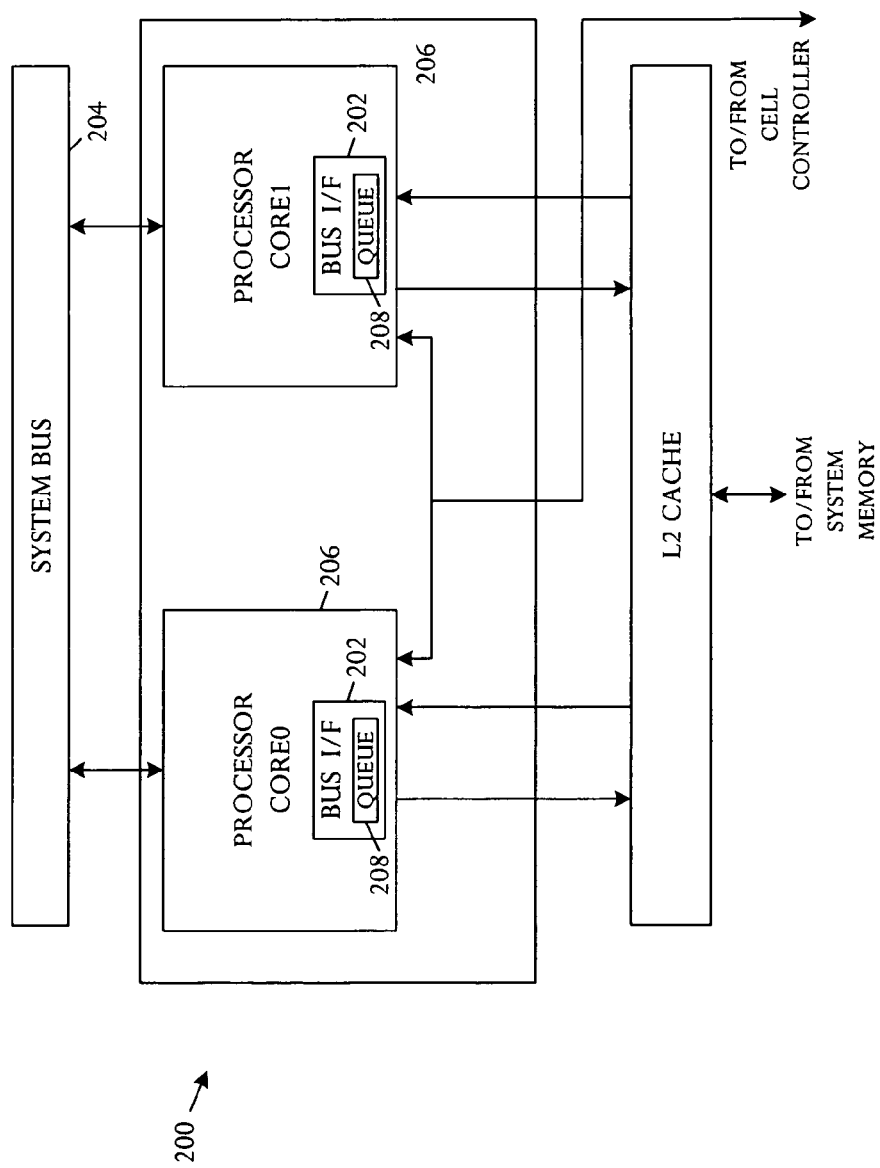
FIG. 2 is a schematic block diagram illustrating an embodiment of a processor with multiple processor cores which is adapted to coalesce snoop responses from the multiple cores.

Referring to FIG. 2, a schematic block diagram illustrates an embodiment of a processor 200 with multiple processor cores 206 which is adapted to coalesce snoop responses from the multiple cores 206. The processor 200 comprises at least one processor core 206 and a bus interface 202 that couples the processor cores 206 to a bus 204. The processor 200 further comprises a queue 208 coupled to the bus interface 202 and adapted to receive snoop responses from the processor cores 206 and coalesce snoop responses from the processor cores 206 into a single snoop response that reflects snoop responses from the processor cores 206.

Figure 3A:
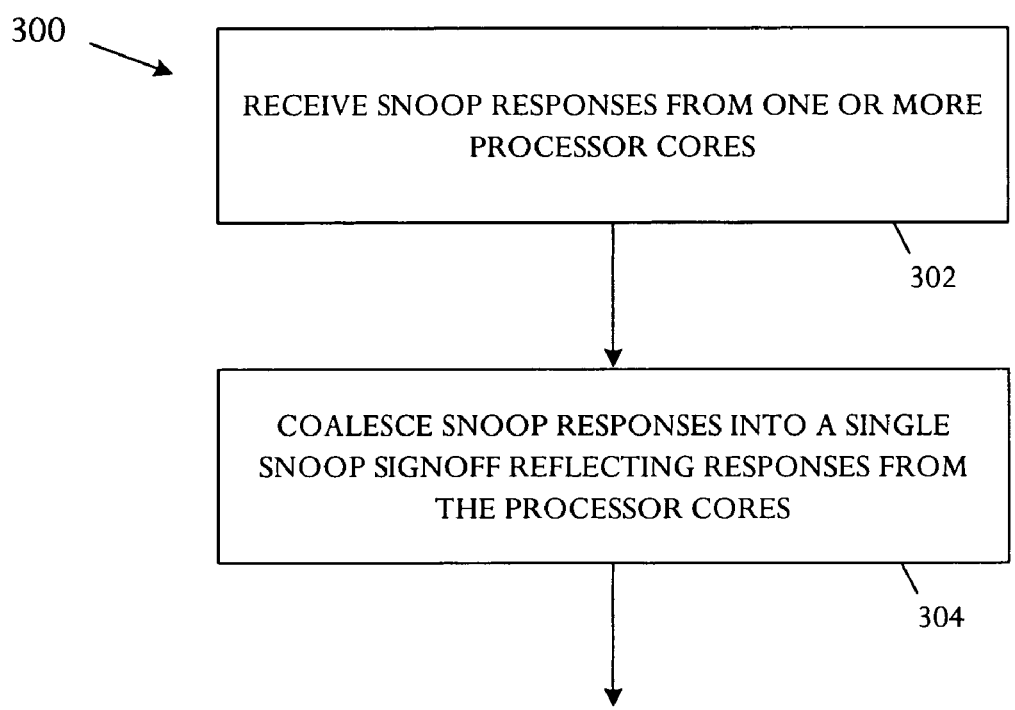
FIGS. 3A, 3B, and 3C are multiple flow charts showing an embodiment of a technique for coalescing snoop responses from multiple processor cores.
Figure 3B:
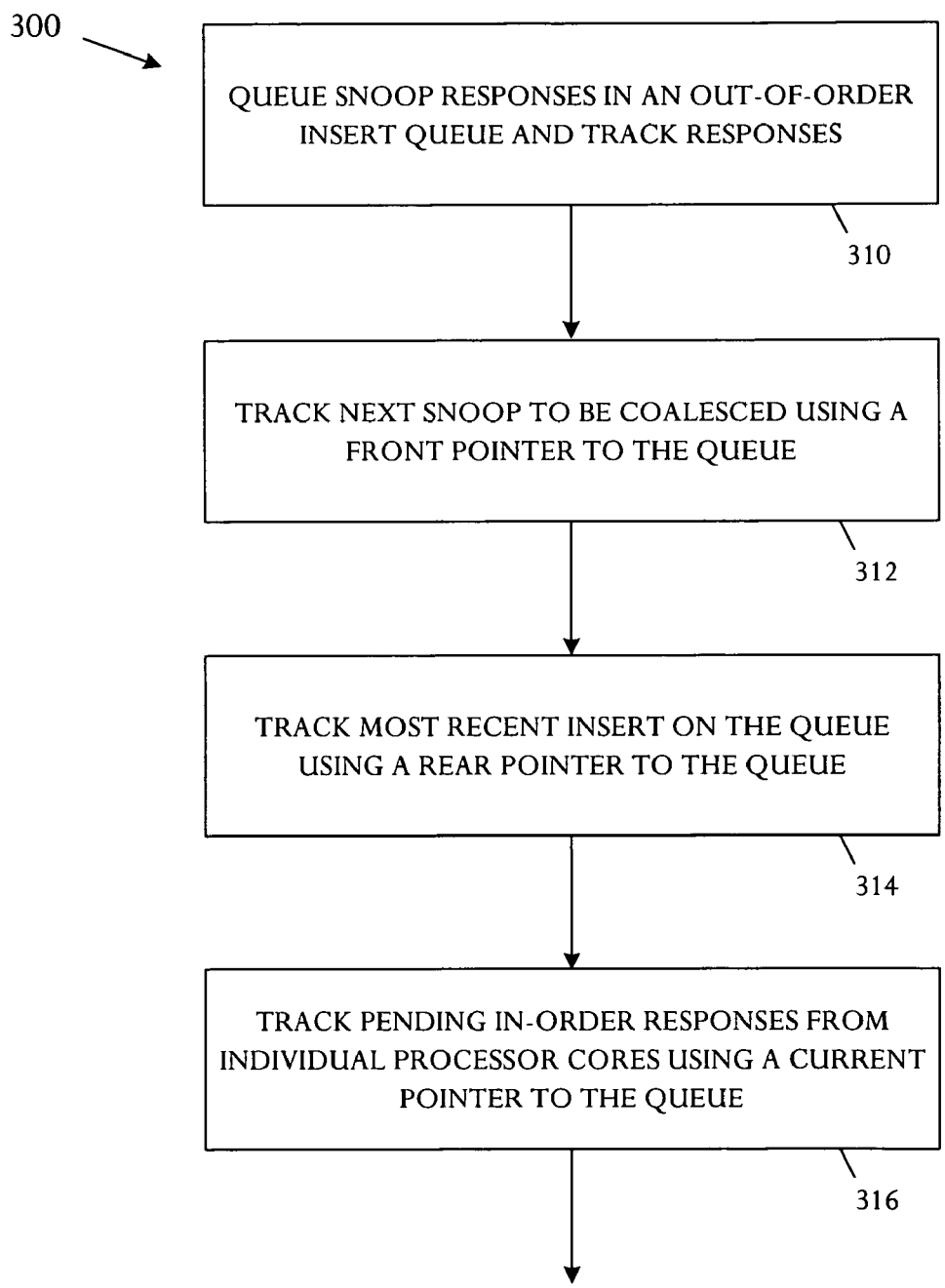
Figure 3C:
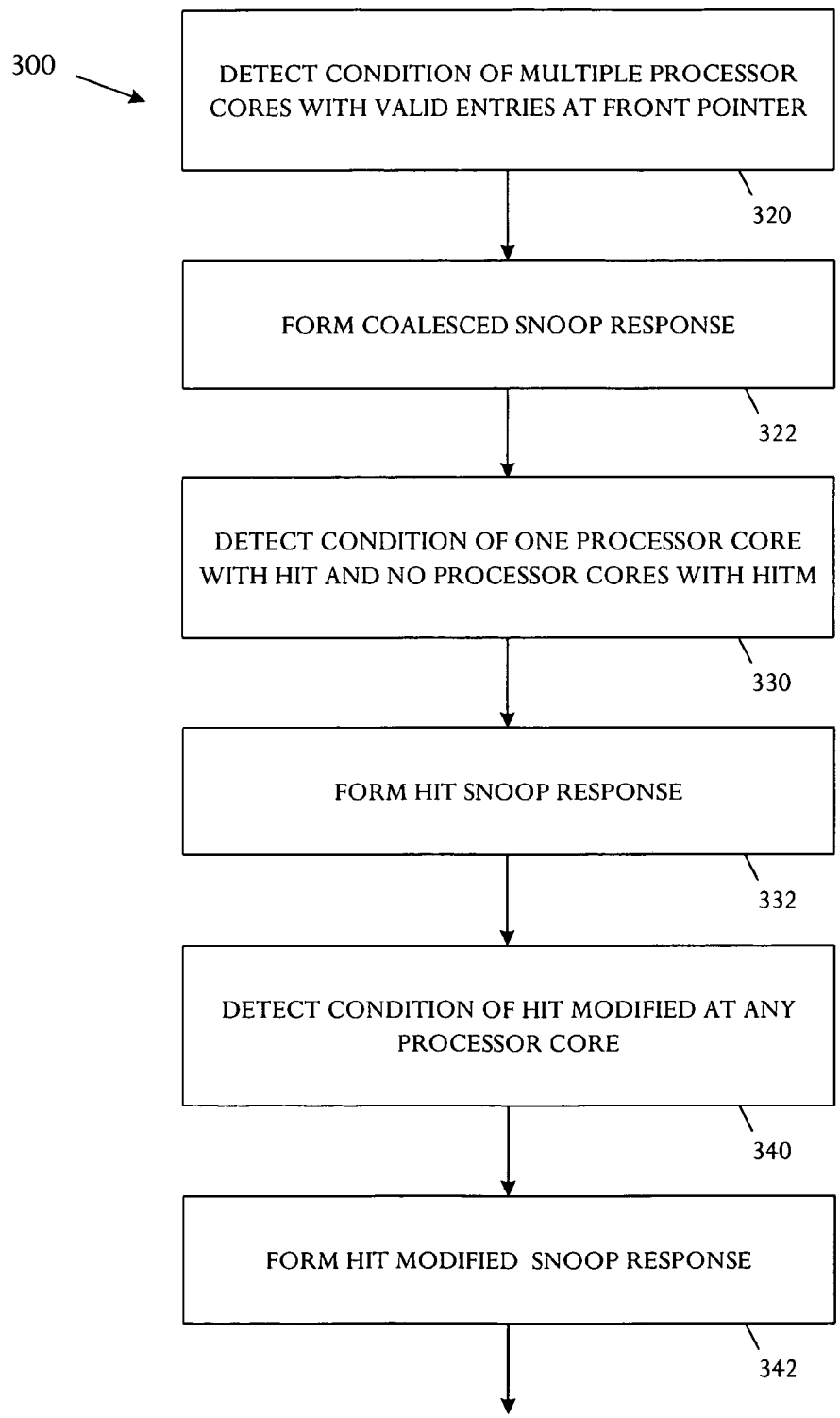

Referring to FIGS. 3A, 3B, and 3C, multiple flow charts illustrate an embodiment of a technique 300 for coalescing snoop responses from multiple processor cores. Logic configured to manage snoop responses may use a snoop coalesce queue control depicted in Table I as follows:

| Slot | Bus Snoop Queue Response Structure | | Bus Snoop Queue Valid Structure |
|---|---|---|---|
| 8 | HitResp[17] | HitmResp[16] | Valid [8] |
| 7 | HitResp[15] | HitmResp[14] | Valid [7] |
| 6 | HitResp[13] | HitmResp[12] | Valid [6] |
| 5 | HitResp[11] | HitmResp[10] | Valid [5] |
| 4 | HitResp[9] | HitmResp[8] | Valid [4] |
| 3 | HitResp[7] | HitmResp[6] | Valid [3] |
| 2 | HitResp[5] | HitmResp[4] | Valid [2] |
| 1 | HitResp[3] | HitmResp[2] | Valid [1] |
| 0 | HitResp[1] | HitmResp[0] | Valid [0] |

The illustrative Snoop Coalesce Queue Control includes nine entries in slots 0 to 8. Although eight of the slots are sufficient to handle eight outstanding snoops in progress, a ninth slot may be added to facilitate pointer usage. One version of the illustrative Snoop Coalesce Queue Control is allocated for each processor core attached to the bus interface.

Referring to FIG. 3A, the illustrative method 300 for handling snoop responses in a processor comprises receiving 302 snoop responses from one or more processor cores and coalescing 304 the snoop responses into a single snoop signoff that reflects the snoop responses from the one or more processor cores.

The method 300 may be implemented in a logic that tracks each slot in the Snoop Coalesce Queue for hit or shared responses and hit modified (hitm) responses. In an analysis of a particular slot, for example slot 0 for a case in which the vector is a hit response [1] set to logic 0 and a hit modified (hitm) response [0] set to logic 1, the vector indicates a modified response and a condition that no response was returned on the hit. In summary, bits reflecting all responses received from the processor cores are entered in the coalesce queue structure and checked for a condition of multiple valid bits. When multiple valid bits are present, the responses are coalesced into a single response and sent to the bus.

The logic may include a procedure that handles snoop queue valid bits. In a system with two processor cores, the logic monitors for valid bits from both processor core 0 and processor core1. The bus is in-order so that snoops are monitored using an in-order snoop coalescing queue. When a valid bit is asserted for processor core0 and processor core1, the logic monitors the responses to determine the identity of the responses as hit and hit modified (hitm) responses on both processor cores. The logic coalesces the responses and drives the coalesced response on the bus. In a particular embodiment, the logic includes routines for handling pointers such as preventing advancement of the front pointer beyond queue boundaries, appropriately handling an empty queue, avoiding setting a valid bit for snoops that are not sent back to the originating core. The logic asserts the valid bits to set a response for a slot, marks a slot valid with a miss response for processor core 0 or processor core 1, maintains the coalesced valid bit on the bus, and signals the coalesced snoop response on the bus.

The logic monitors snoop queue valid bits and responds with a signal coalesced snoop response. The logic monitors the location of the snoop response using the front queue pointer. At the front pointer location, logic monitors to determine whether a valid bit is asserted for both processor core0 and processor core1. When the valid bit is asserted for both processor cores, the coalesced snoop response is also valid. The valid snoop response may occur either from a snoop response or from a transaction whereby snoops are not reflected back to the originating processor core. For the condition of a valid snoop response in both processor cores, a valid sign-off is generated although the logic has not yet determined the particular type of sign-off. The next logic section determines the sign-off type as a function of the hit-shared (hit) signal and the hit-modified (hitm) signal on the bus. Assertion to logic 1 of both the hit and hitm signals indicates an illegal case that causes a snoop stall on the bus.

Logic determines whether a single hit-modified (hitm) signal is asserted for the two cores by monitoring at the location designated by the front pointer and determining whether core0 has an asserted hitm signal or core1 has an asserted hitm signal. If one processor core has the hitm signal asserted, the logic asserts the coalesced hitm signal. If neither hitm signal is asserted, logic also monitors the hit-shared (hit) signal and determines the hit response from processor core0 and processor core1. For a hit response for both processor core0 and processor core1, and no hitm response from either processor core, the line is shared in core0 or is shared in core1 but is not modified in either processor core0 or core1.

Referring to FIG. 3B, the method 300 may further comprise actions including queuing 310 the snoop responses in an out-of-order insert queue and tracking the responses. A next snoop response to be coalesced is tracked 312 using a front pointer to the queue. The most recent insert on the queue is tracked 314 using a rear pointer to the queue. Pending in-order responses from individual processor cores are tracked 316 using a current pointer. In the illustrative embodiment, responses are inserted into the location designated by the rear pointer and pulled from the location designated by the front pointer.

In a typical embodiment, the method 300 may be implemented in a logic that tracks individual slots in the Snoop Coalesce Queue Control including tracking of hit or shared responses and hit modified (hitm) responses.

Referring to FIG. 3C, the method 300 further comprises detecting and responding to various conditions. A first condition is receipt of a response from a processor core, for example via an interface between a bus logic block and a processor core, while no bus snoops occur. Accordingly, the method 300 comprises detecting 320 a condition whereby multiple processor cores have valid entries at the front pointer. In response to the condition, a coalesced snoop response is formed 322. In a particular embodiment, logic tracks snoop queue response signals for each slot. For example, the logic monitors for a condition whereby the queue is updated to reflect that a snoop response is received from the bus logic block-processor core interface and no bus snoops occur.

The logic monitors the current loop pointer. All snoop sign-offs are performed in-order so that the bus logic-core interface also responds in-order. A snoop received from the bus is reflected back to the block that generated the snoop, which performs a snoop of the entire processor core and returns a response. The bus logic-core interface may perform various actions in combination with sending a request. For example, the bus logic-core interface may send a snoopable request whereby the bus logic-core interface backsnoops local logic (reflecting a snoop request back to the originating local processor core) and monitors for presence of a modified or dirty line. Specifically, the bus logic-core interface may have a miss on a line when a dirty line is actually present. Accordingly, the logic acts by sending a bit that is to be snooped.

In the first condition, a snoop response is received from the bus logic-core interface and no bus snoops are present to be handled by the logic. The logic responds by determining the position on the in-order queue to insert the snoop response based on the rear pointer and, updated on a cycle-by-cycle basis, entering the snoop response for hit and hit modified (hitm) signals on the snoop coalesce queue. The logic drives other bits in the queue without change, thereby maintaining the current state.

A second condition occurs whereby no snoop response is received from the bus logic-core interface and a valid snoopable bus snoop occurs. In the condition, the bus logic-core interface has not sent a snoop but did previously send a valid request that has already been sent to the bus. No modification has occurred in the cache so that bits are set in the queue indicating presence of a clean line at the position of the current pointer. Accordingly, the method 300 comprises detecting 330 a condition in which multiple processor cores have valid snoop responses at the front pointer indicating a hit from one processor core and no hit modified responses from any processor core. In response to the condition, a hit response is formed 332.

In the second condition, a transaction has been applied to the bus and monitored by snooping the bus to determine whether the processor cores are to be snooped. The transaction was previously sent in combination with a signal that the bus snoop was not snoopable. Accordingly, logic in the processor core has sufficient information to determine that the core does not contain a modified or dirty line. Therefore, logic reflects the signal and control information indicating a non-snoopable status whereby a valid bit is not sent to designate that snoops are not sent back to the originating processor core. In a particular embodiment, a vector of "00 is written to the current location in the queue indicating absence of both the hit and the hit modify conditions whereby the core is not snooped.

In other cases, the bus logic-core interface recognizes that a snoop has recently been performed so that the snooped line is not possibly in the cache, whereby the logic responds by returning a request in combination with a bit indicating the logic is not snoopable so that backsnooping is not necessary. Accordingly, the logic acts by marking the current location or queue to indicate that a miss has occurred.

In summary, snoop requests from the bus logic-core interface either request a further snoop or request that no snoop be performed locally, assuming the logic will be clean on the requested line, while requesting snoops for other agents on the bus.

The first and second conditions, respectively receiving a snoop response back from the bus logic-core interface, and where no snoop response back from the bus logic-core interface is needed, are relatively simple cases.

In a third condition, a snoop response is received from another processor whereby all processor cores are always to be snooped. The third condition is a relatively difficult case. A snoop response is received from the bus logic-core interface and a new transaction is sent that does not need to be snoopable. Accordingly, a snoop response is received from a completely different transaction on the same cycle that information is received from the bus indicating no need to snoop.

In the condition of a valid snoop response from the bus logic-core interface and a valid non-snoopable bus snoop for snoops that are not reflected back to the originating core, the method 300 further comprises detecting 340 a condition of the multiple processor cores having valid snoop responses at the front pointer that indicate a hit modified response from any processor core. In response to the detected condition, logic forms 342 a hit modified response.

In the third condition, a valid snoop response is received from the bus logic-core interface and a valid non-snoopable bus snoop occurs. Logic responds by setting two snoop responses in one cycle. For the two transactions in a single cycle, logic inserts a snoop response for one of the transactions and sends an indication that the line is clean for the second snoop. Multiple transactions in a single cycle can occur in several conditions. For example, logic may handle both snoop responses from a core processor and from the bus logic-core interface occurring in one cycle and iterate through multiple variations of the condition.

For the third condition, as for the first and second conditions, logic operates the snoop coalesce queue control in the manner of an eight-entry queue. Logic enters bits corresponding to responses at the position designated by the rear pointer. When a transaction is generate by the bus logic-core interface, the logic receives the transaction and transfers the transaction to the bus, snoops the bus, and monitors the snoop coalesce queue. Two events may occur. If the transaction is snoopable, nothing is placed on the queue. Instead a clean indication is entered. Otherwise, a transaction may be reflected back from a previous snoop. The logic prevents sending the reflected snoop back to the processor core to avoid superfluous bandwidth usage.

The logic manages multiple possible cases that may occur as subsets of the third condition. Using the current pointer and the rear pointer, the logic determines an appropriate location in the snoop coalesce queue to log bits corresponding to transactions which have snooped the cache and transactions that do not snoop the processor cores. The current pointer tracks an appropriate location in the queue to insert the transaction bits as a function of the position of a snoop response relative to queue depth and position of a current snoop that is not to be sent back to the processor core.

In a particular implementation, logic includes multiple case statements designating every possible combination of conditions based on the location of the rear pointer and the current location of sign-off. Logic is included for every combination of rear pointer and current pointer location. The rear pointer designates the number of snoops pending on the bus. Up to eight snoops can be pending on the bus. The case statements enable actions depending on the position of a transaction relative to the total possible number of snoops that can be outstanding. Logic evaluates where the snoop response should be sent and the current position in the list that is handling snoops.

Accordingly, when a snoop response occurs, the rear pointer always points to responses returning from the processor core. The rear pointer always points to transactions on the bus. The current pointer points to transactions that do not require a snoop response from the processor core. The current pointer is used for the case that a sign-off is given for a transaction that does not need to be snooped.

The illustrative implementation uses a nine-entry queue for handling eight snoops to facilitate wrap-around handling.

The logic also monitors for illegal conditions such as illegal hit responses. One example of an illegal hit response is a condition that is not valid for all cores, indicating a coherency error on the bus or in the processor cores. The logic may monitor the hit, hitm, and or valid signals to identify the particular type of error. For example, assertion of the hit-modified (hitm) signal in multiple processor cores is indicative of an error since the condition of a hit-modified in one processor core and hit-shared in another processor core is not possible and is thus an invalid condition.

In an illustrative embodiment, the logic in the bus interface monitors and detects illegal conditions specifically for the processor cores that connect to the bus through the bus interface and does not detect illegal conditions for other processor cores connected to the bus. The logic monitors for illegal conditions through analysis of the hit, hitm, and/or valid bits entered on the signal slot designated by the front pointer for the processor cores managed by the bus interface.

Logic performs various utility and management actions including handling of pointer advancement. For example, pointers are generally advanced by one queue slot per cycle but may be advanced two slots in some conditions such as when two snoop responses occur in a cycle. The pointer handling utilities are configured to appropriately manage events at the first and last slots of the queue. Logic is also configured to appropriate manage pointers in response to illegal or invalid conditions, for example by advancing or decrementing a pointer by two slots in appropriate conditions to ignore or flush illegal queue entries.

Logic also may limit the number of snoops on the bus using a diagnose bit set to a selected depth whereby the logic compares the number of snoops to the depth and, if exceeded, asserts a bit that blocks the next request on the bus.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, the illustrative structures and techniques may be implemented with any appropriate number of processor cores and with any arrangement of queues and buses.

What is claimed is:

1. A bus interface comprising:
   an interface coupled between a bus and at least two processor cores; and
   a queue coupled to the interface and adapted to snoop responses from the at least two processor cores and coalesce snoop responses from the at least two processor cores into a single snoop response to the bus that reflects snoop responses from the at least two processor cores;
   wherein the queue is operative as a snoop coalesce queue comprising an array of multiple-bit storage elements per processor core, bit fields of the storage elements comprising a hit response bit, a hit modified (hitm) response bit, and a valid bit.

2. The bus interface according to claim 1 further comprising:
   a logic coupled to the queue and adapted to manage the queue as an out-of-order insert queue and supply the coalesced single snoop response to the bus.

3. The bus interface according to claim 1 further comprising:
   a plurality of pointers configured to track entries on the queue, the plurality of pointers comprising a front pointer adapted to track a next snoop response to be coalesced to the bus, a rear pointer adapted to track a most recent snoop inserted on the queue, and a current pointer adapted to track pending in-order responses received from each of the processor cores prior to coalescing snoop responses and passing the coalesced response to the bus.

4. The bus interface according to claim 3 further comprising:
   the logic adapted to detect a condition of a plurality of processor cores having valid entries at the front pointer, and coalesce a snoop response on the detected condition for passing the coalesced response to the bus;
   the logic adapted to detect a condition of a plurality of processor cores having valid snoop responses at the front pointer that indicate a hit response from one processor core and no hitm responses from any processor cores, and form a hit response on the detected condition; and
   the logic adapted to detect a condition of a plurality of processor cores having valid snoop responses at the front pointer that indicate a hitm response from a processor core, and form a hitm response on the detected condition.

5. The bus interface according to claim 3 further comprising:
   the logic adapted to detect a condition of a plurality of processor cores having illegal snoop responses.

6. A processor comprising:
   at least two processor cores;
   a cache coupled to the at least two processor cores;
   a bus interface coupled between a bus and the at least two processor cores; and
   a queue coupled to the interface and adapted to snoop responses from the at least two processor cores and coalesce snoop responses from the at least two processor cores into a single snoop response to the bus that reflects snoop responses from the at least two processor cores;
   wherein the queue is operative as a snoop coalesce queue comprising an array of multiple-bit storage elements per processor core, bit fields of the storage elements comprising a hit response bit, a hit modified (hitm) response bit, and a valid bit.

7. The processor according to claim 6 further comprising:
   a logic coupled to the queue and adapted to manage the queue as an out-of-order insert queue and supply the coalesced single snoop response to the bus.

8. The processor according to claim 6 further comprising:
   a plurality of pointers configured to track entries on the queue, the plurality of pointers comprising a front pointer adapted to track a next snoop response to be coalesced to the bus, a rear pointer adapted to track a most recent snoop inserted on the queue, and a current pointer adapted to track pending in-order responses from each of the processor cores.

9. The processor according to claim 8 further comprising:
   the logic adapted to detect a condition of a plurality of processor cores having valid entries at the front pointer, and coalesce a snoop response on the detected condition;
   the logic adapted to detect a condition of a plurality of processor cores having valid snoop responses at the front pointer that indicate a hit response from one processor core and no hitm responses from any processor cores, and form a hit response on the detected condition; and the logic adapted to detect a condition of a plurality of processor cores having valid snoop responses at the front pointer that indicate a hitm response from a processor core, and form a hitm response on the detected condition.

10. The processor according to claim 8 further comprising:
the logic adapted to detect a condition of a plurality of processor cores having illegal snoop responses.

* * * * *